(Model.)

T. T. WOODRUFF.
STEAM PLOW.

No. 263,279.

Patented Aug. 22, 1882.

2 Sheets—Sheet 1.

Attests
Wesley Williams

Inventor
Theodore T. Woodruff
By his atty.

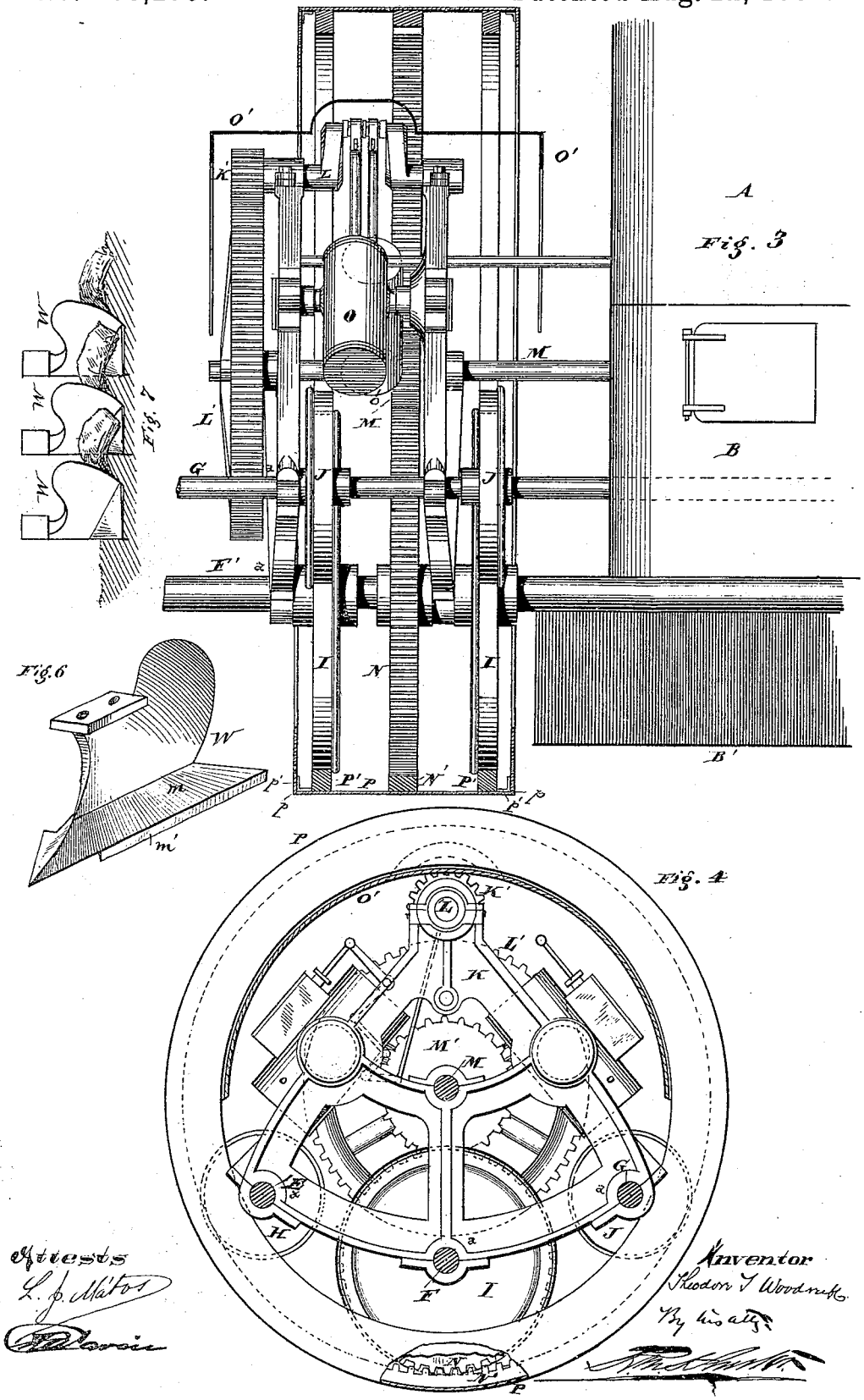

UNITED STATES PATENT OFFICE.

THEODORE T. WOODRUFF, OF PHILADELPHIA, PENNSYLVANIA, ASSIGNOR TO ELIZA M. WOODRUFF, OF SAME PLACE.

STEAM-PLOW.

SPECIFICATION forming part of Letters Patent No. 263,279, dated August 22, 1882.

Application filed January 23, 1882. (Model.)

*To all whom it may concern:*

Be it known that I, THEODORE T. WOODRUFF, of the city of Philadelphia, county of Philadelphia, and State of Pennsylvania, have invented an Improvement in Steam-Plows, of which the following is a specification.

My invention relates to the combination of mechanical devices and appliances, so that a motor with plow attachments by which land can be cultivated by steam-power is produced.

Figure 1:
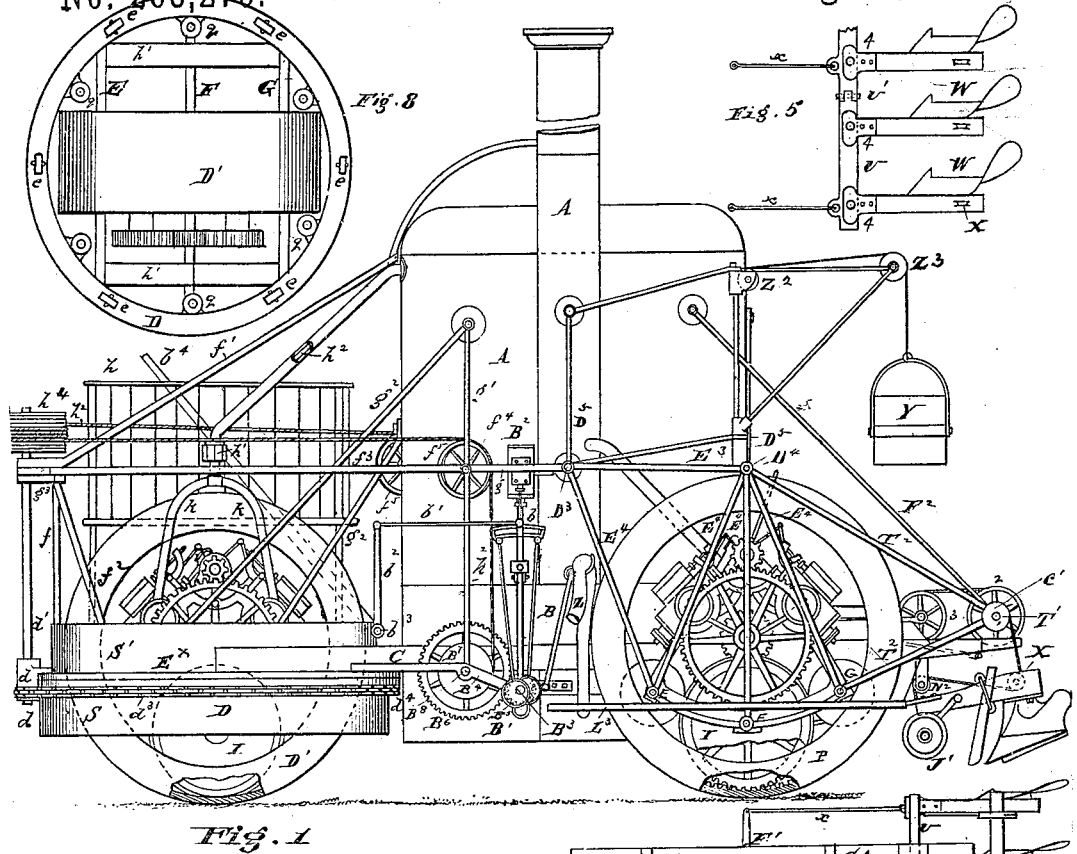
Figure 2:
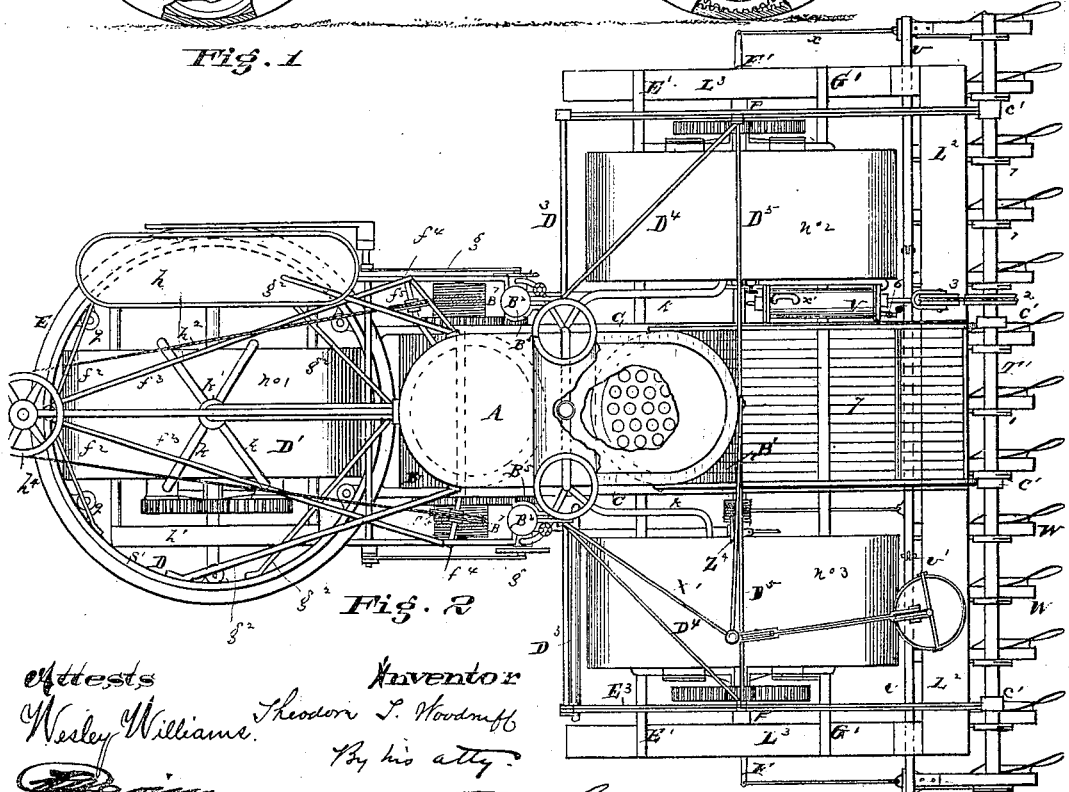

In the drawings, Figure 1 is a longitudinal side elevation of a steam-motor with plows attached. Fig. 2 is a plan of same. Fig. 3 is a vertical cross-section of Fig. 4, taken at the center vertical line thereof, but showing the motive power in elevation, together with a broken section of the steam-boiler. Fig. 4 represents a side elevation of one of the revolving track-drums, steam-engines, and the flanged wheel-tracks upon which said engine is carried, with its gear-wheels and roofing. Fig. 5 is a section of a jointed draft-bar to which the plows are attached. Fig. 6 represents the body of a plow, showing a curved landside thereof. Fig. 7 represents a gang of plows at work. Fig. 8 represents a plan of the rotating truck, showing the application of the guiding-track with an annular truck-frame.

A represents the exterior of a vertical tubular and center return and flue return steam-boiler.

A' represents the smoke-stack.

B represents the fire-box, and B' represents the water-tank. Said tank in length equals the length of the fire-box, and also its width as far back as will clear the cranks of the vertical guiding-engines. At B *c* is an offset. From this point back the tank reaches out on each side near to the track-drums, the upper side or part of this tank forming the bottom of the ash-pit. Vertically through this tank may be placed a series of tubes directly under the fire-grates, so that the ashes which fall from the fire-grates can be passed down through the said tubes, after imparting a share of their caloric to the water in the tank. The tank, as described, admits of a shallow ash-pit, and its location admits of water gravitating to it from the supply-wagon. The fire-box of this boiler has preferably parallel sides and parallel ends, and a fire-door at the back end thereof. Upon the top sheet of this fire-box are placed four vertical cylinders, one centrally at each end thereof, with vertical tubes in each of them, and also one centrally upon each side thereof, so located that each of the two cylinders projects one-half of its diameter over the fire-box, and each of them has a fire-flue through it from fire-box to smoke-stack. The said four cylinders are connected to each other on opposite sides by inside and outside boiler-plates, so riveted to the said cylinders as to make a water-space between them, which water-space opens into the water-space of the said cylinders, making one body of water, thus leaving an open center vertical passage-way for hot gases. The two tubular cylinders will be connected at their upper ends by a drum upon each of the two upper tube-sheets, which drums will be connected by a crown-sheet, so that a return-chamber is made to serve each of the two sets of tubes, each opening into the vertical center space. At the base of each of the two flue-cylinders is an opening from the said center space to each of the said flues, so that the heated gases derived from the fuel consumed in the fire-box will pass up through the tubes into the return-chamber, thence into and down to the top of the fire-box, thence into and up through the flues into the smoke-stacks and out.

I have described my boiler because many of its features are particularly applicable, and perhaps indispensable, in the mechanical combination of the parts constituting this motor— viz., its general proportion, compactness with reference to capacity, which enables me to apply the three independent carrying-drivers hereinafter described with a small amount of frame-work, and permits of the three drivers being near to each other, so that it can be turned quickly and upon a small area, though I do not in this application claim its novelty, as it will form subject-matter of a future application.

C C represent two longitudinal stretchers of iron, one upon each side of the fire-box, firmly secured thereto. Each of the said stretchers is molded to a semicircular piece of iron, E×, at the front end of each of them. Their back ends extend back to and carry on each of them a journal-box, C′. These two stretchers, with the said semicircular section to which they are welded, in combination with the annular flanged truck-yoke D, constitute a horizontal longitudinal bed-frame, which compels the guiding of front annular rotating truck, D′.

There are three round iron cross-bars, E F G, in the annular truck-frame, which constitute a part of the said truck. There are also three round iron cross-bars, E′ F′ G′, placed at right angles with the longitudinal stretchers, and are firmly secured to them at their crossings, and constitute a part of the motor's bed-frame. The said cross-bars E F G and E′ F′ G′ serve as the axles upon which the flanged wheels H I J and H′ I′ J′ are respectively placed. The said flanged wheels H I J are the railway-truck wheels, which run on the annular rails within the revolving truck. Wheels I carry the principal part of the weight upon the truck. Its contact with the rails is in a vertical line with the bearing of the drum upon the ground, and is obviously less destructive to the drum than if otherwise. The wheels H and J are properly supporters of the revolving tracks—the front one by its pressing against the rails and causing them to advance, while the rear one regulates the movement, and the flanges of the two wheels hold the drum in its vertical position. The intermediate spur-wheel, N, which transmits motion or power to the annular rack, makes connection with said rack in the aforesaid vertical line of wheel I, and with the same advantage desired. The said cross-bars serve as the foundation of the propelling steam-engines, as the engine-housings K at their base are clamped to the said cross-bars at $a$ $a$. A pair of the said housings support and carry two steam-cylinders, $o$ $o$, set at right angles to each other. Both of said cylinders are coupled to the same crank on shaft L, which revolves in its bearings upon the head of the housings. Upon this crank-shaft pinion K′ is located, and meshes into spur-wheel L′ on an intermediate shaft, M, the said intermediate shaft being supported upon cross-bars of the housings. On this intermediate shaft there is also a pinion, M′, which meshes into an intermediate spur-wheel, N, which is placed and revolves upon the cross-bar F′, which is also an axle for the flanged truck-wheels I, which run upon the annular rails P′. This intermediate spur-wheel meshes into an annular rack, N′, which is secured to the interior of the tread-plate of the track-drum P. The track-drums are made of thick plate-iron, of an annular belt of about thirty-four inches in width and about seven feet in diameter, and upon each edge of the said belts or treads is flanged inwardly, and about twelve inches in depth. The said belt and flanges are rigidly made fast to each other at $p$ by application of angle-iron $p'$. One wing of the angle-iron is riveted to the said belt and the other riveted to the said flange. There are two annular rails, P′, in each drum, one near each of the two flanges, and centrally between the said two rails is located an annular rack, N′. All of the several parts which constitute this drum are rigidly secured to each other.

O′ represents roofing which is within the track-drum and over the machinery for its protection from dirt or water falling from its track-drum, Figs. 3 and 4, all illustrative of the track-drums, and also of the machinery located in them, which constitutes one of the independent propelling-engines, with their connecting-gears and revolving track-drums P. A description of one represents the three that are shown in Figs. 1 and 2. I will denominate them drivers "No. 1," "No. 2," and "No. 3."

Fig. 8 represents the plan of the front rotating or guiding truck, D′. In the annular frame D is placed a series of anti-friction carrying-wheels, $e$, which are carried and revolve upon horizontal center pins, upon which the truck-yoke D′ rests, and from the inner edge of the said annular frame there projects a series of lugs, in each of which is placed a vertical center pin. Each of the said pins receives and carries a center supporting anti-friction wheel, $q$. The inside diameter of the opening of the annular frame D corresponds to the diameter of the circumference of the said series of said wheels, so that the said yoke will be carried upon the said vertical wheels and be held centrally upon the truck D′ by the horizontal wheels. E F G are cross-bars of said frame, and are also axes for the flanged wheels H I J. On the bottom of this annular frame-plate there is a narrow vertical flange, to which is firmly riveted a broad belt, S, of iron. (I call this belt a "petticoat.") There is also a similar belt, S′, in the upper side of the yoke. The object of said belt is rigidity of frame-work.

At the extreme back end of the bed-frame of this motor is a plow-lifting shaft, T′, resting in its bearing-boxes $c'$. Said shaft extends out from the bed-frame upon each side far enough to cover the entire gang of plows, with journal-bearings near the ends of the shaft, which are supported by hanger-bars F² F². The back end of the bed-frame is supported by truss-rods T² T². On the said shaft there are placed as many sheaves 1 as there are plows in the gang, and also one other larger sheave, 2, on the same shaft, and directly in front of the said sheave 2, and at right angles to the lifting-shaft, is located a steam-engine cylinder, V, affixed to the bed-frame of the motor, with the piston-rod to operate through the back cylinder-head. The outer end of the said rod is forked, and has a pin through the said forks, upon which a sheave, 3, is placed. There is also a cross-bar secured to the bed-frame in front of the lifting-shaft, and to the under side of this cross-bar there is attached a series of sheaves, N², corresponding to the number of plows, one over each of the plows in the gang. Directly under the bar is a jointed draft-bar, U, with joints at U'. To this bar there are attached a series of draft-rods, x x, which are hinged to cross-bar F'.

The several plows, W, are firmly hinged to the draft-bar at 4, so that they can swing sidewise, but cannot tilt over, and each plow will have a gage-wheel, J', on its front end, so that the depth of plowing can be regulated. The said wheels will carry the draft-bar, and its joints will allow of its conformation to the undulation of the ground. The said bar is free to move up and down. Each of the plows has a sheave, X, near its standard. A wire rope is attached to the front end of each of the plow-beams, thence up to and over sheave $N^2$, thence back to and under sheave X, thence up to and made fast to the periphery of its sheave 1 on the lifting-shaft, and a much stouter wire rope is attached to the periphery of sheave 2, with one coil around it, and over from the rear forward to and one-half coil around sheave 3 and made fast to the bed-plate, so that when steam is applied to the piston at 5 its rod will draw sheave 3 away from the lifting-shaft and take the coil of rope from sheave 2, thereby revolving the lifting-shaft, which will wind up the ropes attached to the plows, which will in turn lift the plow to the desired height, at which point the steam in the lifting-cylinder will pass the piston, through a curved steam-pipe at $x'$, set in the said cylinder for that purpose, so that the steam in the said cylinder will bear equally upon each side of the piston and will cause it to be stopped. The said plows will be let down by letting the steam out of the cylinder V at 6. The space directly back of the boilers and between the longitudinal stretchers is decked over, and is used as a coal-receptacle, and is also the fireman's deck. Upon each side of the fireman's deck 7 runs a plank, $L^2$, placed directly over the plow-beams, each plank extending out to another plank, $L^3$, placed outside of the machinery and track-drums, so that the machinery can be lubricated when in motion.

To the boiler, above the track-drums, the cross-bars or axles E F G are rigidly and securely stayed, outside of the track-drums, by a system of brackets made fast to the boiler by a horizontal arm at $D^3$, and another at $D^4$, each of which is supported at its outer extremity by braces $D^5$ $D^5$, which are secured to the boiler, near the top thereof, and also by a brace, $A^3$, extending from the foot of one of the horizontal arms to the extremity of the other arm, and also by a tie, $E^3$, between extremities of the said two arms, and from the extremity of the said two brackets down to the said cross-bars or axles there are four lateral braces or struts, $E^4$. This construction is the same on both sides.

Z represents a water-supply hose, by which water can be taken from a supply-wagon. To the water-tank there is also a coal-lifting crane, mounted upon a step which is located near the extremity of one of the brackets above described, in which there is set a hollow crane-post, which extends up to and is supported in position by a cross and lateral truss, X'. The arm and brace of said crane are forked at their extremities, through which are placed center pins, which receive and carry sheaves $Z^2$ $Z^3$.

Y represents a coal-tank. From the said coal-tank there is a wire rope up to and over sheave $Z^3$, thence to sheave $Z^2$, thence down through the crane-post and under an angle-sheave, (not shown,) thence horizontally along to and over another angle-sheave, $Z^4$, and down to and made fast to the periphery of a coiling and lifting clutch-drum on intermediate shaft, M.

The guiding-truck D of this motor is rotated upon its vertical center by an application of a reversible two-cylindered steam-engine, $B^2$, one cylinder upon each side of the boiler, its crank-shaft $B^3$ crossing the boiler under the ash-pit and over the water-tank, and is supported and carried upon hangers $B^4$. There are two pinions, $B^5$, upon this crank-shaft, one upon each side of the boiler, each of which meshes into and drives a spur-wheel, $B^6$, which in turn revolves a coil lifting drum, $B^7$, upon a shaft, $B^8$, supported by hangers $B^4$. The steam-valves are worked by links $b$, moved by a connecting-rod, $b'$, from link to arm $b^2$ on rock-shaft $b^3$, which is operated by a lever, $b^4$. At the extreme front of this motor's bed-frame is affixed a bearing-box, $d$, which receives and carries a vertical shaft, $d'$. Upon said shaft, below the said bearing-box, is a pinion, $d^2$, upon which a strap linked chain, $d^3$, runs. Each end of the said chain is fastened to the periphery of the rotating truck-frame at $d^4$, so that when the said pinion is made to revolve the chain will compel the truck to rotate upon its center. Directly back of the said vertical shaft stands a post, $f$, firmly made fast to the yoke of the bed-frame, and from the head of the said post a strong brace, $f'$, extends to the front and near to the top of said boiler, and is made fast thereto. There are also two lateral braces, $f^2$, from the said yoke to the head of the said post, and there are also two horizontal ties, $f^3$, from the head of the said post to the two horizontal center pins, $f^4$, on which angle-sheaves $f^5$ run, one on each side, said center pins or bearings being held in place by brace $g$ and tie $g'$. There are four other braces, $g^2$, from the yoke to the boiler, and which are made fast to it. At the head of the post aforesaid is journal-box $g^3$, which carries the said vertical shaft $d'$.

$h$ represents the plowman's deck and railing.

$h'$ represents the run-plank in the annular truck-frame.

$h^2$ represents a wire cable, one end made fast to the periphery of the drum $B^7$, and with several coils around it; thence up to an angle-sheave, $f^5$, over and forward to the coil-drum $h^4$ on the head of the vertical shaft $d'$, with several coils around said drum, and back to the other angle-sheave, $f^5$, over and down to the coil-drum $B^7$, on the opposite side to where it started, and also on the opposite of its fellow drum, with several coils around it and made fast to the periphery thereof, so that when the cable winds upon one of the coil-drums it unwinds from the other, and vice versa.

$k$ represents the steam-pipes, and $k'$ represents universal joint in steam-pipe, so that the annular guiding-truck can rotate upon its vertical center.

$k^2$ represents a double steam-pipe, the exhaust-steam insulating the live steam.

I will not give any further specification of steam-pipes, for the reason that there are many ways of application which are well understood.

The plows of the gang are so modeled that they are well worked abreast of each other. The one at the head of the gang next to the unplowed ground is like the ordinary modern plow. All of the others have the improved landside.

The front end of the landside-plate $m$ stands in a vertical position, and from that vertical line it represents an evenly-twisted plate from a vertical line at the front end to a horizontal line at the back end thereof, with the base thereof maintaining its position. From the bottom of the said landside there is a longitudinal vertical flange, $m'$, with a chisel-edge in front. This flange will cut into the subsoil and stand against the pressure upon moldboard. The receding or falling back of the landside-plate admits of the turf falling over from the adjoining plow, as shown in Fig. 7. The aforesaid motor runs upon the unplowed ground, and draws the plows after it.

There are three separate railway-trucks. Each of the three trucks is provided with a pair of annular rails, upon which the said trucks are run. Each pair of rails is located in and secured to the inside surface of the annular tread-plate of the revolving track-drum. The gage of said rail corresponds to the gage of the said truck. The three track-drums, by their revolutions, constitute three separate road-beds, which can be laid at will, with choice of direction. Upon each of the said trucks there is located, within the drum, a steam-engine, with cog-wheel gear connection to an annular rack secured to the inside of the said tread-plate of the track-drum, as before described, so that when steam is applied to the engine its force is communicated to and transmitted by said gears to the annular rack and causes the track to move forward, and by its weight the drum is made to revolve and lay the road-beds for three propelling steam-engines. Each of the three track-drums (with the several parts as shown in Figs. 3 and 4) is conjoined by the frame and yoke, which holds them together as one combined motor.

This motor is organic. Each organ has its function to perform. Each of the three drivers, when on a straight line, though of the same pattern, will differ in its revolutions just in proportion to the difference of the distance of the earth-surface over which the drums revolve, and yet each exerting the same force, and when running upon a curved line no two of them will make the same number of revolutions, for the reason that each one runs different distances, and yet in perfect harmony to the full extent of their equal power. It will be observed here that each carrier is also a propeller. There are other steam organs in this combination—one for operating the guiding-truck, one for lifting the plows, and one for lifting the coal-tank.

Having now described my invention, what I claim as new, and desire to secure by Letters Patent, is—

1. The revolving steering track-drum, in combination with mechanism to rotate it, located within the same and secured to a horizontal circular frame, and a bearing for said circular frame, secured to or forming part of the main frame of the machine, substantially as set forth.

2. The revolving track-drum P, with rails P', in combination with the rack N', frame K, provided with supporting and guide wheels J H I, engines O O, working the same shaft and set at right angles to each other, gear N, meshing with rack N', and intermediate gears by which the rotation of the engine-shaft rotates said gear N, substantially as described.

3. The revolving track-drum P, with rails P', and rack N', in combination with the truck carrying flanged guide-wheels H J I, which run upon the rails, and gear-wheel N, which meshes with the rack, the said guide-wheels I I being upon the same axle with gear-wheel N, and the flanges on wheels H and J being on opposite sides to the flanges on wheels I I, substantially as described.

4. The revolving track-drum P, with rails P', rack N', and truck located within said drum P, in combination with engine, gears, and roof, substantially as described.

5. In a self-propelling carriage, a front or guiding truck arranged to turn upon a vertical axis and provided with separate or independent propelling-power, said propelling-power being adapted to actuate said guiding-truck, causing it to rotate upon its horizontal axis and independent of its movement upon its vertical axis, substantially as and for the purpose specified.

6. In combination with guiding-truck D', the reversible steam-engines, with pinion $B^5$, spur-wheels $B^6$, coil-drums $B^7$, wire rope $h^2$, angle-sheaves $f^5$, drum $h^4$, and vertical shaft, with pinion and chain, as set forth.

7. The lifting steam-cylinder, in combination with the lifting-shaft, independent plows, and lifting-cords connecting each plow to the periphery of the shaft or a pulley secured thereon, substantially as set forth.

8. The draft-bar Y, made in sections, pivoted together and arranged in a line at right angles to the movement of the machine to which it is secured, in combination with the plows pivoted to said draft-bar, said plows being all arranged abreast and independent of each other, as set forth.

9. The jointed draft-bar to which the plows are independently hinged, in combination with the plows all arranged abreast, and a lifting-shaft provided with pulleys, to the periphery of which are secured the lifting-cords, there being a separate cord to each plow, and which cord passes over pulleys, as shown, to allow the plow to automatically adjust itself to the ground, as shown and set forth.

10. The steering or guiding track-drum, in combination with a steam-motor located within said drum, in combination with steam and exhaust pipes, and a universal or tubular joint in said steam-pipe, and arranged over the pivotal point of said track-drum to allow it to be turned horizontally without injury to the steam-pipes, as and for the purpose specified.

11. A plow provided with a curved or receding landside, vertical or nearly vertical in front and horizontal or nearly horizontal in the rear, to enable a gang of plows to be worked abreast, substantially as shown.

12. A plow provided with a curved or receding landside, $m$, which is vertical or nearly vertical in front, but is horizontal or nearly horizontal in the rear, in combination with a vertical longitudinal flange, $m'$, extending along the bottom edge of the said curved landside-plate, as shown.

In testimony of which invention I hereunto set my hand.

THEODORE T. WOODRUFF.

Witnesses:
 R. M. HUNTER,
 LISLE STOKES.